United States Patent [19]

Williams

[11] 4,364,334

[45] Dec. 21, 1982

[54] LOW PROFILE MULTI-TIER, AUTOMATED, POULTRY CAGE FEEDER SYSTEM

[75] Inventor: William R. Williams, Roswell, Ga.

[73] Assignee: U.S. Industries, Inc., New York, N.Y.

[21] Appl. No.: 226,352

[22] Filed: Jan. 19, 1981

[51] Int. Cl.³ .............................................. A01K 39/01
[52] U.S. Cl. ................................................ 119/52 AF
[58] Field of Search ................ 119/18, 52 AF, 52 CF

[56] References Cited

U.S. PATENT DOCUMENTS

| 3,768,442 | 10/1973 | Van Huis | 119/18 |
| 3,900,006 | 8/1975 | Shockley, Jr. | 119/18 |
| 3,918,405 | 11/1975 | Hostetler | 119/52 AF |

OTHER PUBLICATIONS

Big Dutchman Brochure entitled Profit-Tier Reverse Cage System, Publication SL-179-65, A U.S. Industries Company.

Primary Examiner—Hugh R. Chamblee
Attorney, Agent, or Firm—Price, Heneveld, Huizenga & Cooper

[57] ABSTRACT

A feeder unit is provided for automated, multi-tier animal feed systems, such as for poultry and the like, of the type having a plurality of conveyors to which feed is supplied from a remote storage bin. The feeder unit has a low profile housing, and a mounting bracket which positions the conveyor drive motor alongside the housing to minimize the overall height of the feeder unit, so that the feeder units can be vertically stacked closely together for substantial space savings and efficiency. The housings include a passageway through a sidewall and a base thereof, in which a feed supply conduit is inserted to transport feed from a remote storage bin into a hopper portion of the feeder units.

9 Claims, 5 Drawing Figures

LOW PROFILE MULTI-TIER, AUTOMATED, POULTRY CAGE FEEDER SYSTEM

BACKGROUND OF THE INVENTION

The present invention relates to automated animal feed systems, and in particular to a low profile conveyor feeder.

Multi-tier animal confinement systems, such as those used for poultry and disclosed in Big Dutchman brochure PROFIT-TIER Publication No. SL-179-65, which is hereby incorporated by reference, are presently used quite extensively by commercial growers. In such systems, it is advantageous to retain a maximum number of birds in a given space, so as to improve efficiency of the operation, and reduce the associated costs on a per bird basis.

One means to achieve operational efficiency is to provide four batteries or tiers of cages. However, because of the height of the conveyor feed units, the cage tiers cannot be stacked closely together, thereby resulting in additional material costs, and increasing the building size required to house the system. Although the conveyor feeders can be staggered to reduce the overall height of the system, as shown by the corner hoppers in the Big Dutchman PROFIT-TIER brochure noted above, this arrangement increases the total length of the system. Further, where a substantial offset is required, there may be insufficient room to permit each feeder to be located at a corner of the conveyor, thereby requiring two different styles of conveyor feeders for the same system. Hence, staggered corner feeder arrangements are generally considered less desirable than systems wherein the feeders are located at one corner of the conveyors, and are disposed in a generally vertically aligned configuration.

The problems encountered in stacking corner hoppers vertical one above the other without any offset in order to condense the size of the entire system, is that the height of the hoppers is such that in order to produce a low profile multi-tier poultry cage system, the hoppers would be stacked so closely together in vertical alignment that is would be virtually impossible to drop the feed into the hoppers from the overhead conveyor. Further, most corner feed hoppers have drive motors mounted on the upper surface of the outlet side of the housing to achieve a reasonably direct drive line to the feed chain drive sprocket which also increases the vertical profile of the entire system. To my knowledge, no one has conceived of any arrangement or construction or corner hoppers whereby the hoppers can be located one on top of the other with little vertical space therebetween so as to reduce the profile of the entire system.

SUMMARY OF THE INVENTION

One aspect of the present invention is to provide a low profile feeder unit for automated, multi-tier animal feed systems, such that the respective conveyor tiers can be stacked closely together, without interfering with the conveyor feed chain drive or impairing the flow of fresh, make-up feed to the hoppers. In accordance with my invention, a mount supports the feeder drive motor alongside the hopper housing, thereby minimizing the overall height of the corner hoppers and permitting close stacking of the same. Preferably, the motor mount is disposed on the interior side of the housing outlet end, and includes a vertically sliding plate to which the motor is attached, and an adjustment screw which raises and lowers the motor with respect to the housing for adjusting the tension of the drive belt.

The present invention is particularly adapted for corner hoppers, and includes a housing having a passageway extending through one sidewall and the base thereof, in which a conventional feed conduit is inserted. Hence, the corner hoppers can be vertically stacked closely together for maximum efficiency, and the passageways provide an uncomplicated design which permits feed to be introduced into the hoppers through an overhead conveyor mechanism. Preferably, the passageways extend through the interior end of the housings to alleviate interference with the other portions of the conveyors.

These and other features, advantages, and objects of the present invention will be further understood and appreciated by those skilled in the art by reference to the following written specification, claims and appended drawings.

DETAILED DESCRIPTION OF THE PREFERRED EMBODIMENTS

Figure 1:
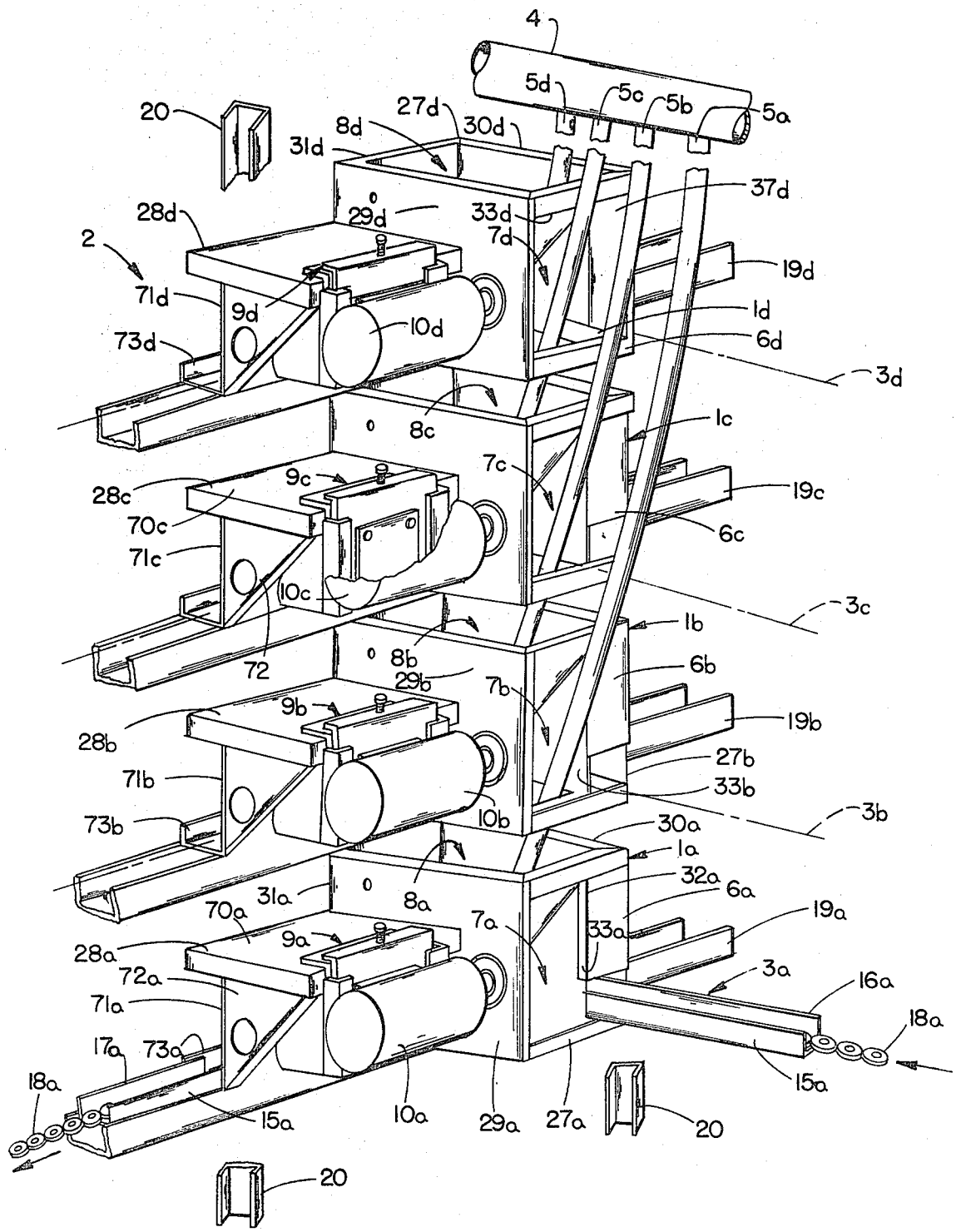
FIG. 1 is a fragmentary perspective view of a multi-tier poultry feed system, including four low profile hopper units embodying the present invention.

For purposes of description herein, the terms "upper", "lower", "right", "left", "rear", "front", "vertical", "horizontal", and derivatives thereof shall relate to the invention as oriented in FIG. 1. However, it is to be understood that the invention may assume various alternative orientations, except where expressly specified to the contrary.

The reference numeral 1 (FIG. 1) generally designates a corner hopper embodying the present invention, which is particularly designed for use in conjunction with automated, multi-tier animal feed systems 2, such as for poultry and the like. Feed system 2 is of the type having a plurality of feed conveyors or conveyor mechanisms 3 to which feed is supplied from an overhead header 4 through individual tubes or conduits 5 which extend into each corner hopper 1. Each corner hopper 1 has a housing 6 and drive motor mount 9 which allow corner hoppers 1 to be vertically stacked closely together to achieve significant space savings and efficiency. Housing 6 includes a passageway 7 through one sidewall and the base of corner hopper 1, in which a feed supply conduit 5 is inserted to transport feed from a remote storage bin (not shown) into the hopper 8 of each corner feeder. A mounting bracket 9 supports a conveyor drive chain motor 10 at a position alongside housing 6 to minimize the overall height of the corner hopper.

The configuration of corner hoppers 1 allows them to be stacked closely together to achieve maximum efficiency. The illustrated poultry feed system 2 includes four tiers of conveyors 3. Since the various parts of each tier are substantially identical, corresponding parts are represented by the same reference numeral in FIG. 1, except for the suffixial designations "a", "b", "c", and "d" to designate the specific tier. Although the present invention is described herein in conjunction with corner hoppers 1a–d, it is to be understood that the concepts disclosed are equally applicable to other types of conveyor feeder units, including those which mount between the corners of the conveyor.

Each conveyor 3a–d includes an open feed trough 15 having an inlet or return side 16 and an outlet side 17. A feed carrier, such as a conveyor belt or the illustrated drag chain 18 is translated continuously along the bottom of feed trough 15, and provides a constant supply of feed to the confinement cages (not shown). Each conveyor tier and corner hopper 1 is supported on a generally horizontally extending channel 19, which are in turn interconnected and supported above the ground by vertical support channels 20 spaced along the length of the system.

In the arrangement illustrated in FIG. 1, the four corner hoppers 1a–d are vertically aligned, such that the base of the upper corner feeder is positioned directly above the top of the lower corner feeder. Corner feeders 1a–d are preferably stacked as close together vertically as possible. In this example, the lower surface of horizontal support channels 19 are disposed adjacent the upper surface of the lower hopper 8, such that the distance between adjacent corner feeders is substantially equal to the height of the horizontal support channels 19. This distance is less than the diameter of feed conduits 5, so that it is not possible to insert one of the feed conduits between adjacent corner hoppers 1a–d. Further, even if somewhat smaller feed conduits could be used, they would require specially designed, rigid angles to direct the feed into hoppers 8a–c from the generally vertically extending portions of feed conduits 5a–c, and therefore restrict or impede the flow of feed to hoppers 8a–c.

Each corner hopper housing 6 (FIG. 1) includes two, generally rectangular portions 27 and 28 disposed at the inlet and outlet sides 16 and 17 of housing 6 respectively. The inlet housing 27 includes a pair of sidewalls 29 and 30, an exterior end wall 31, and an interior end side 32 having an opening 33 therethrough which forms part of passageway 7, as described in greater detail hereinafter.

Figure 2:
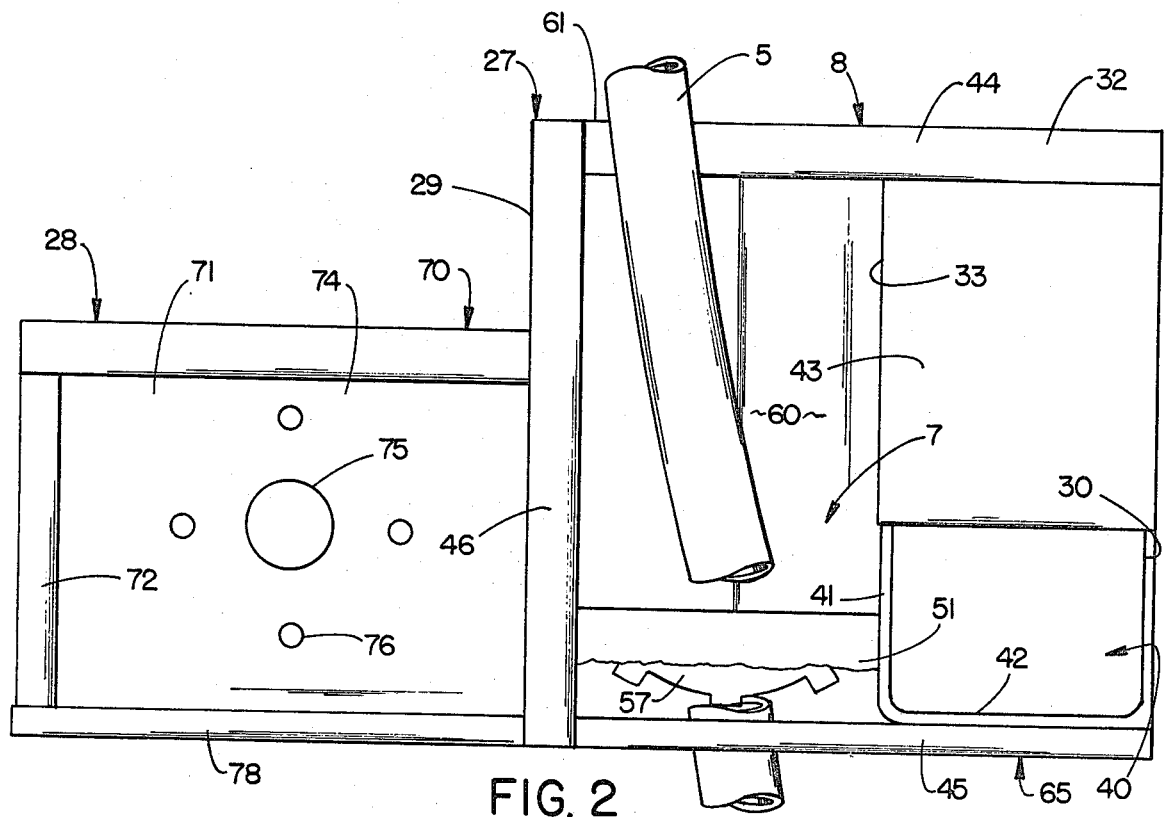
FIG. 2 is a side elevational view of the hopper unit, taken from an inlet side thereof.
Figure 3:
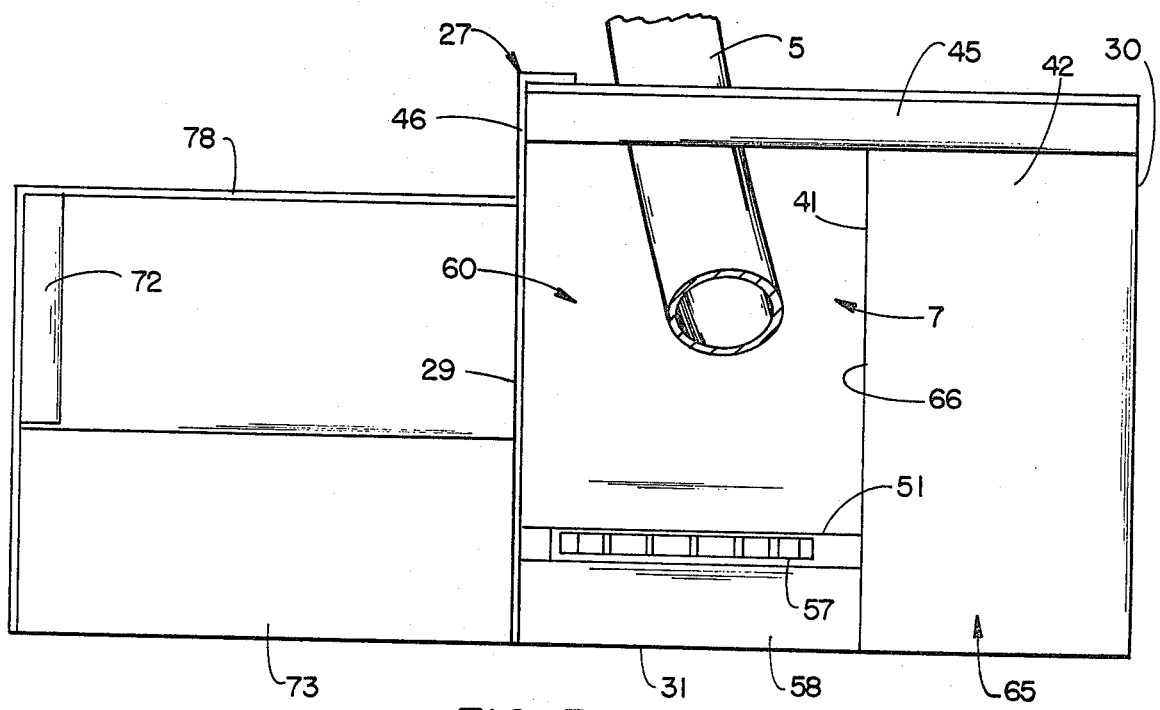
FIG. 3 is a bottom plan view of the hopper unit shown in FIG. 2.

With reference to FIGS. 2 and 3, inlet housing 27 includes a U-shaped return trough 40, defined by exterior sidewall 30, an intermediate sidewall 41, and a base 42. A cover 43 is positioned over the side edges of walls 30 and 41 at the upper portion of the corner hopper, so as to impart a generally rectangular configuration to the return chute opening, into which the feed trough 15 is inserted. The interior end 32 of inlet housing 27 further includes upper frame member 44, lower frame member 45, and side frame member 46, which are rigidly interconnected with the sidewalls of the housing and trough to form a rigid structure. The opening 33 (FIG. 2) in interior end wall 32 is defined by the illustrated portions of frame 45 at the base, frame 44 at the top, frame 46 on the left-hand side, and sidewall 41 with the flange of cover 43 on the right-hand side, as viewed in FIG. 2.

Figure 4:
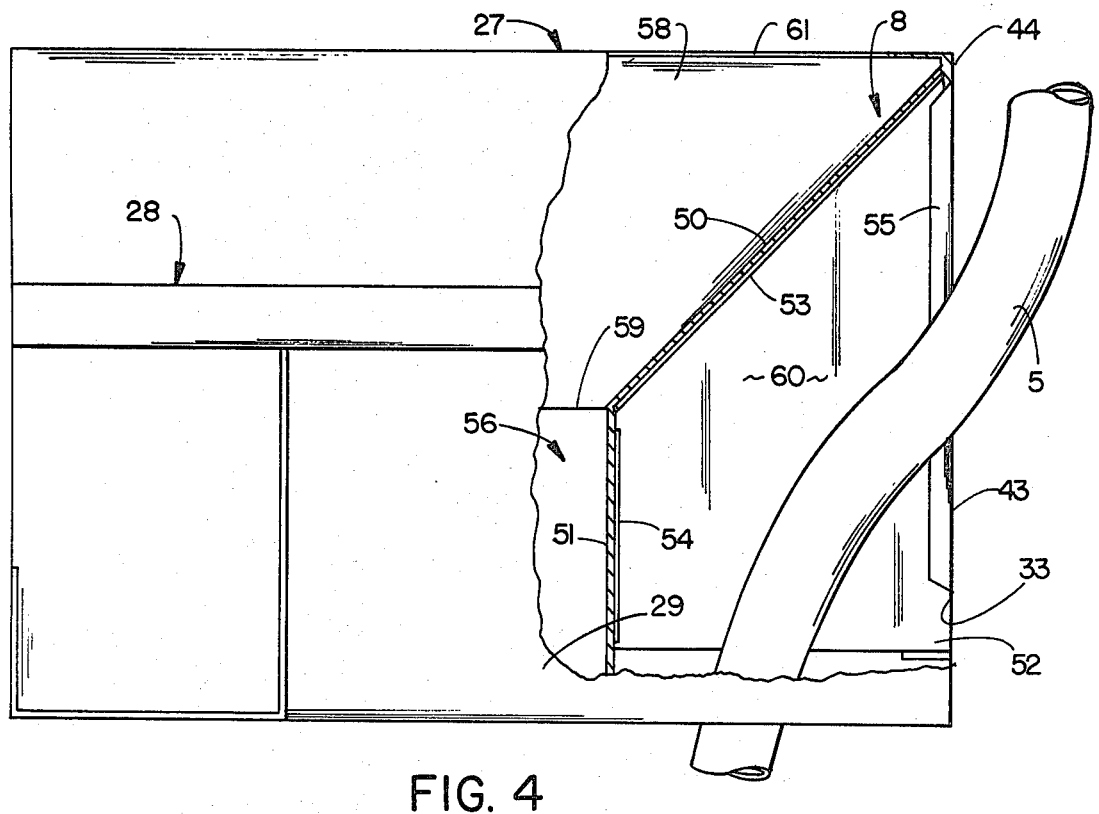
FIG. 4 is a side elevational view of the hopper unit, taken from an outlet side thereof, with a portion thereof broken away to reveal internal construction.

With reference to FIG. 4, the portion 8 of the hopper is located in inlet housing 27, and includes an inclined base 50 extending from the upper frame member 44 of housing 6 to a vertically disposed rear wall 51. A trapezoidally-shaped sidewall 52 extends along the interior side 41 of inlet trough 40, and is fastened to upper walls 50 and 51 by means such as the illustrated flanges 53 and 54, which are welded to the adjacent hopper walls. Cover member 43 also includes a lip or flange 55 which extends over the outer edge of sidewall 52 and is attached thereto by means such as welds.

Hopper wall 51 forms part of a pocket 56 located at the lower end of portion 8, into which a feed remix wheel or sprocket 57 (FIG. 2) is rotatably mounted, as described in greater detail hereinafter. The remaining hopper walls 58 (FIG. 4) extend from the rim 61 of hopper portion 8 to the upper edge 59 of pocket 56, and direct feed from the hopper onto remix wheel 57. The housing sidewalls 52 and 29, in conjunction with the hopper walls 50 and 51, form a cavity 60 disposed generally beneath hopper portion 8, which communicates with housing opening 33, and is shaped to receive feed conduit 5 therethrough, as described below.

With reference to FIG. 3, the base 65 of inlet housing 27 includes a large opening 66 therethrough, which when the system is assembled, is located directly above the hopper portion 8 of the underlying corner hopper unit 1. Opening 66 communicates with housing cavity 60, and in conjunction with sidewall opening 33, defines passageway 7, through which feed supply conduit 5 extends, so as to transport feed from a remotely disposed source (not shown) into the hopper unit 1. In this example, base 65 is formed by the lower surface of chute base 42, which is connected with lower frame member 45, and side frame member 46. The illustrated base opening 66 has a generally rectangular shape, and is defined by that area disposed between associated portions of rear wall 51, interior trough sidewall 41, front frame member 45, and side frame member 46.

With reference to FIGS. 1 and 2, the outlet portion 28 of housing 6 includes a top plate 70 with a J-shaped channel 71 attached along one side thereof, and a triangular gusset 72 at the outer end of the housing to securely interconnect plate 70 with channel 71. Upper plate 70 is disposed at an elevation lower than the upper rim 61 of hopper portion 8, and extends in an interior direction along only a portion of housing sidewall 29, so as to form a space on the interior side of housing portion 28 in which drive motor 10 is positioned. The lower end of J-shaped channel 71 forms an outlet trough 73 in which the mating portion 17 of open feed trough 15 is received. The rear wall 74 (FIG. 2) of channel 71 includes a central aperture 75 with fastener apertures 76 spaced thereabout for mounting a speed reducer 77 (FIG. 5) to housing 6, as described in greater detail hereinafter. A laterally extending frame brace 78 connects the lower end of gusset 72 with the vertical frame 46 of housing portion 27 to form a very rigid structure.

Figure 5:
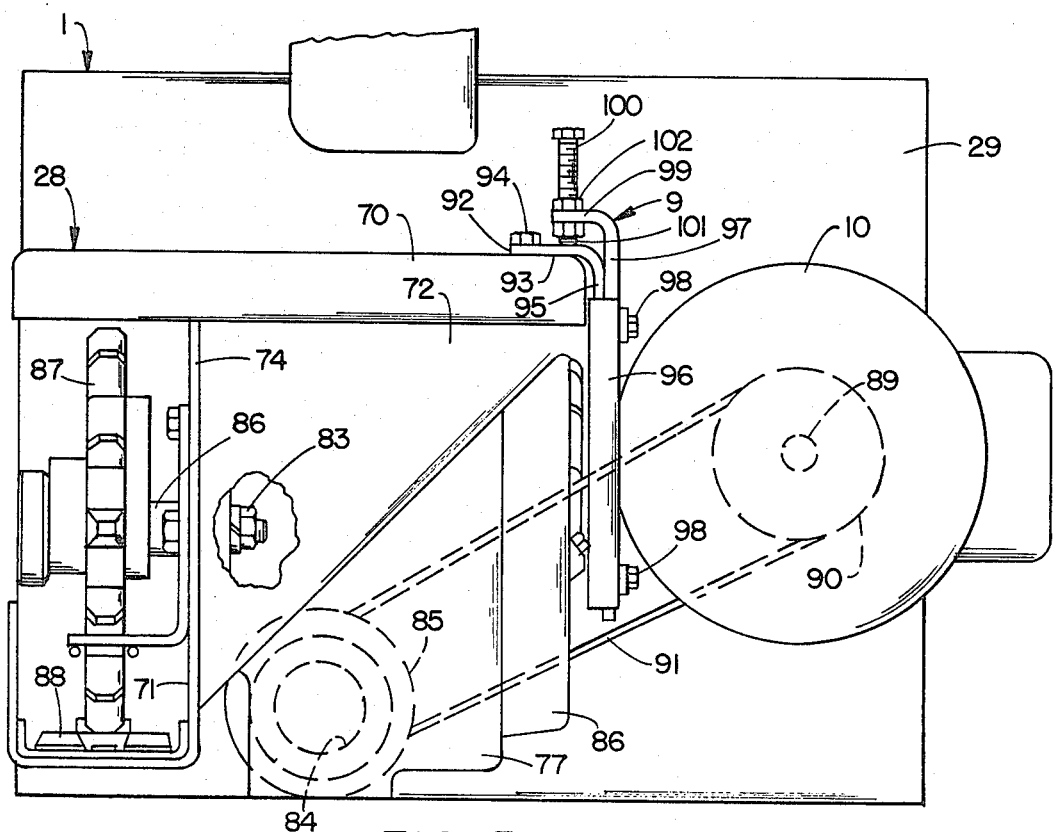
FIG. 5 is a side elevational view of a motor mount arrangement embodying the present invention, shown attached to the hopper unit.

As best shown in FIG. 5, the illustrated corner hopper unit 1 has a conventional belt driven speed reducer 77 mounted on the rear plate 74 of outlet housing channel 71 by means such as fasteners 83. Speed reducer 77 includes a belt driven input shaft 84 having a pulley 85 mounted thereon, and is oriented toward the interior sidewall 29 of housing portion 27. The housing 86 of speed reducer 77 is generally shaped to fit within the cavity formed by gusset 72, housing sidewall 29, and the lower surface of plate 70. Speed reducer 77 also includes an output shaft 86 which extends at right angles to input shaft 84, through the center area of housing wall 74, and includes a conventional chain drive sprocket 87 mounted thereon. During use, activation of motor 10 rotates drive sprocket 87, which in turn engages feed chain 88 in the output trough, and thereby translates the feed chain in the conveyor.

The motors 10 are supported in a generally horizontal orientation by mounting brackets 9. Each illustrated motor includes a drive shaft 89 with a pulley 90 mounted on the outer end of shaft 89, in alignment with speed reducer pulley 85. A flexible belt, such as the illustrated V-belt 91, extends between pulleys 85 and 90, and is entrained thereover for transmitting rotational motion therebetween.

With reference to FIG. 1, mounting brackets 9a–d support drive motors 10a–d on the interior end of housing portions 28a–d, so as to minimize the overall height of the corner hoppers, and thereby permit the corner hoppers to be vertically stacked closely together to achieve a very compact, low profile design. Each mounting bracket 9 (FIG. 5) includes an L-shaped base or support plate 92, having a horizontally extending flange or lip 93 attached to the upper surface of housing plate 70 by fasteners 94. The other flange 95 of support plate 92 extends in a substantially vertical orientation adjacent the interior side of outlet housing 28, and abuttingly overlies the outer end of speed reducer 77. A pair of C-shaped channels 96 are mounted along both side edges of base plate 92, and face inwardly in an opposed fashion. A mounting plate 97 is slideably mounted between channels 96 of support plate 92, and includes suitable means, such as fasteners 98 on the vertically extending portion thereof for securely mounting motor 10 thereon. The upper end of mounting plate 97 comprises an in-turned flange 99, facing the direction of base plate flange 93, and includes an adjustment screw 100 threadedly mounted therein in a parallel relationship with the longitudinal axis of mounting plate 97. Adjustment screw 100 includes a free end 101 which abuts a stationary surface of housing 6, whereby extension and retraction of adjustment screw 100 raises and lowers motor 10 with respect to housing 6, and adjusts the tension of drive belt 91. In this example, a pair of nuts 102 are positioned on adjustable screw 100 on either side of mounting flange 99 to lock adjustment screw 100 in place. The weight of motor 10 maintains mounting plate 97 in abutment with support plate 92.

Corner hoppers 1a–d (FIG. 1) are assembled by positioning the same on horizontal support channels 19a–d, and attaching each corner hopper thereto. In this example, corner hoppers 1a–d are arranged in a vertically aligned relationship. However, it is to be understood that the present invention may also be used in conjunction with poultry feeding systems wherein the cage tiers are inclined slightly in an A-frame configuration, and wherein the feeder units are stacked closely enough together to prevent feed conduits from being inserted therebetween.

The lower ends of feed conduits 5a–d are inserted into hoppers 8a–d respectively. The first conduit 5d can be set directly into the hopper 5d of the uppermost corner feeder 1d. The second conduit 5c is threaded through the passageway 7d in corner feeder 1d, and thence into the open end of hopper 8c. In like manner, conduit 5b is inserted through passageway 7c in corner feeder 1c, and thence into hopper 8b of corner feeder 1b. Finally, feed conduit 5a extends vertically along the inside of the system, and is threaded through passageway 7b in corner feeder 1b, and thence into hopper 8a of corner feeder 1a. In this manner, conduits 5a–d can be communicated with their respective hoppers 8a–d without severe bending or kinking of the feed conduits which might restrict or otherwise impede the flow of feed therethrough.

Each motor mounting plate 97, with an associated motor 10 attached thereto, is then slid into its respective base plate channels 96, so that the motor 10 hangs from the mounting plate with its axis of rotation in a substantially horizontal orientation. Drive belt 91 is then positioned over the motor and speed reducer pulleys 900 and 85, and screw 100 is adjusted to insure proper belt tension.

The low profile corner hoppers 1a–d permit the corner hoppers to be vertically stacked closely together to achieve significant space savings and efficiency. The passageways 7a–d formed in corner hopper housings 6a–d permit feed conduits 5a–d to be threaded through the housings to deliver feed to the feed unit hoppers 8a–d without severely bending the conduits, or otherwise restricting the free flow of feed to the corner hoppers. The mounts 9a–d for conveyor drive motors 10a–d support the motor at a position alongside housings 6a–d, so as to minimize the overall height of the feed corner units, and permit them to be stacked closely together in vertical alignment.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The embodiments of the invention in which an exclusive property or privilege is claimed are defined as follows:

1. In a multi-tier poultry feed system comprising a plurality of stacked conveyor mechanisms to which feed is supplied from a remotely disposed source by feed supply conduits, said mechanisms including a hopper, a feed trough and means for conveying feed from said hopper throughout said feed trough, and wherein said feed supply conduits supply feed to each of said hoppers, the improvement comprising:

said hoppers being vertically stacked closely together one above the other for space saving and efficiency;

said hoppers each including a housing formed by a plurality of walls that define an area for containing feed;

said housing having an upwardly facing open top end for receiving feed;

said housing walls being so arranged to provide a cavity below a portion of the hopper and a side opening leading into said cavity thereby providing communication with said cavity from outside of said hopper; and said cavity and side opening, when one of said hoppers is located directly above another of said underlying hoppers, forming a passageway disposed immediately above the upwardly facing open end of said underlying feed hopper and extending outside the confines of the walls of said housing, whereby said passageway can receive one of said feed supply conduits, so as to permit transport of feed through said conduit from said remotely disposed source into the underlying feed hopper.

2. A multi-tier poultry feed system as set forth in claim 1, wherein:

said feed source is positioned overhead said conveyors, and said feed conduits extend therefrom in a generally vertical orientation.

3. A multi-tier poultry feed system as set forth in claim 1, wherein:
   each housing includes first and second portions in which mutually perpendicular inlet and outlet troughs are respectively disposed and receive an associated conveyor therein; and
   said hopper has inwardly inclined walls, which in conjunction with an interior side of said inlet trough define two sides of said cavity.

4. A multi-tier poultry feed system as set forth in claim 3, wherein:
   said housing first portion has a generally rectangular shape with interior side and end walls and exterior side and end walls;
   said inlet trough extends along the exterior sidewall of said housing first portion;
   said housing opening is disposed in the interior end wall of said housing first portion; and
   said interior sidewall defines a third side of said housing cavity.

5. A multi-tier poultry feed system as set forth in claim 1, wherein:
   said corner hopper units each have a conveyor drive motor and a mount therefor which supports said motor at a position alongside said housing for minimizing the overall height of said corner hopper units and permitting the hoppers to be closely stacked one above the other.

6. A multi-tier poultry feed system as set forth in claim 5, wherein:
   said mount supports said motor in a generally horizontal orientation along an interior side of said housing.

7. A multi-tier poultry feed system as set forth in claim 5, wherein:
   said housing includes an inlet portion in which said hopper is disposed, and an outlet portion on which said drive motor is mounted.

8. A multi-tier poultry feed system as set forth in claim 7, wherein said motor mount comprises:
   support means attached to said housing and including a vertically disposed support plate extending alongside an interior side of said housing;
   a motor mounting plate having a motor mounted thereon;
   one of said support plate or mounting plate has a pair of opposed channels disposed along the side edges thereof;
   the other of said support plate or mounting plate being slideably received between said opposed channels; and
   an adjustment screw threadedly mounted in said mounting plate parallel to the direction of relative slideable movement of said mounting plate with respect to said support plate, said screw having a free end thereof abutting a stationary surface of said support means whereby extension and retraction of said adjustment screw raises and lowers said motor with respect to said housing for adjusting drive belt tension.

9. A hopper construction for poultry feeding equipment, said hopper including a housing with an inlet and an outlet, and a conveyor means passing through said hopper from said inlet to said outlet; a conveyor drive means for driving said conveyor means, said drive means including a drive motor and a support means attached to the housing for supporting said motor at a position alongside said housing for minimizing the overall height of said hopper unit; the improvement comprising said support means including vertically disposed support plate extending alongside a side of said housing adjacent said outlet; a motor mounting plate having a motor mounted thereon; one of said support plate or mounting plate having a pair of opposed channels disposed along the side edges of said support plate;
   the other of said support plate or mounting plate being slideably mounted between said opposed channels; and
   an adjustment screw threadedly mounted in said mounting plate parallel to the direction of relative slideable movement of said mounting plate and support plate; said screw having a free end thereof abutting a stationary surface of said support means whereby extension and retraction of said adjustment screw raises and lowers said motor with respect to said housing for adjusting drive belt.

* * * * *

UNITED STATES PATENT AND TRADEMARK OFFICE
CERTIFICATE OF CORRECTION

PATENT NO. : 4,364,334

DATED : December 21, 1982

INVENTOR(S) : William R. Williams

It is certified that error appears in the above-identified patent and that said Letters Patent is hereby corrected as shown below:

Column 6, Line 9:

"900" should be --90--

Column 6, Line 21:

"motor" should be --motors--

Column 8, Claim 9, Line 46:

after "belt" insert --tension--

Signed and Sealed this

Nineteenth Day of April 1983

[SEAL]

Attest:

Attesting Officer

GERALD J. MOSSINGHOFF

Commissioner of Patents and Trademarks